March 25, 1952 J. HOMAN 2,590,703

STORAGE BATTERY PLATE AND METHOD OF FORMING SAME

Filed Sept. 24, 1949

INVENTOR.
JOHN HOMAN
BY
Hudson, Boughton,
Williams, David & Hoffmann.
ATTORNEYS

Patented Mar. 25, 1952

2,590,703

UNITED STATES PATENT OFFICE 2,590,703

STORAGE BATTERY PLATE AND METHOD OF FORMING SAME

John Homan, Cleveland, Ohio, assignor to Willard Storage Battery Company, Cleveland, Ohio, a corporation of West Virginia Application September 24, 1949, Serial No. 117,601

4 Claims. (Cl. 136—34)

The present invention relates to storage batteries including their manufacture and, more particularly, to storage batteries of the lead-acid type.

Storage batteries are used extensively and are manufactured in a large variety of sizes, etc., depending upon the service for which they are designed. Perhaps the largest volume of storage batteries, however, are used in automobiles and the different manufacturers of batteries of this service have elaborate and expensive machines and other equipment for manufacturing and otherwise processing these types of batteries. Many of the machines and much of the equipment, such as grid pasting machines, plate break-apart machines, and plate-forming tanks, etc., will handle or process only plates of a certain size or shape for which they are especially designed. Because of this, the size, etc., of battery plates have been standardized as far as possible, at least insofar as each manufacturer is concerned, in an attempt to reduce the number and amount of different machines and equipment required and to use the machines and equipment at hand to the best advantage.

The object of the present invention is the provision of a simple, inexpensive and economical way of using equipment designed for manufacturing or processing battery plates of one size width for battery plates of a lesser size width.

More specifically, the principal object of the present invention is the provision of a novel and improved battery plate grid or blank and method of manufacturing battery plates, which will permit the manufacture of battery plates on machines and equipment of a lesser size width from that of the battery plates for which the machines and equipment are designed.

The invention resides in certain combinations and arrangements of parts and procedures and further objects and advantages will be apparent to those skilled in the art to which it relates from the following description of the preferred embodiment described with reference to the accompanying drawings forming a part of this specification, in which.

Figure 1:
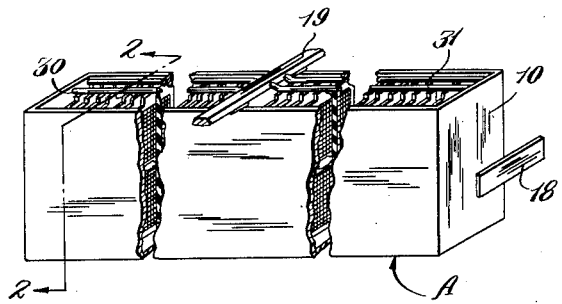
Fig. 1 is a fragmentary view of a forming tank designed for forming battery plates of one size but being used to form plates of a different size.

Referring to the drawings, the reference character A designates a forming tank designed to form double battery plates of a particular size width. The tank proper, designated by the reference character 10, is preferably made of a lead-antimony alloy and is included in the negative side of the forming electric circuit. The interior of the tank is provided with wooden racks 11, 12 along opposite sides and a center rack 13, which racks normally hold the positive and negative plates in alternate, side-by-side, vertical position during the forming operation. The tank A shown is adapted to simultaneously form two rows of plates; however, it is to be understood that the tank may be otherwise formed, if desired.

In the manufacture of storage batteries, it is customary to cast two plates together with the plate grids joined along their bottom edges and the plate lugs projecting from opposite ends as this facilitates handling of the grid, etc., see U. S. patent to Lockwood No. 2,218,612. It is also desirable and customary to use the same grids for both the positive and negative plates, as this reduces the number of different machines required and, in turn, decreases the cost of manufacture.

When the tank A is employed for forming double plates having plate lugs projecting from opposite ends and which plates are of the size for which the tank is designed, the plates are arranged in the racks with the positive plate lugs adjacent to the sides of the tank and the negative plate lugs adjacent to the center of the tank. When so arranged, the negative plates rest upon a longitudinally extending, centrally located, negative electrode or contact 15 projecting above the bottom of the tank and the positive plates rest upon runners 16 and 17 made of wood or other suitable material located at opposite sides of the negative electrode 15 and extending lengthwise of the tank. The negative electrode 15 forms a part of the tank proper and is connected to the negative terminal of the forming tank circuit by a conductor or bus bar 18. The positive plates are connected in the forming circuit by lead wires burned or otherwise connected to the upper terminals of positive posts, which lead wires, in turn, are connected to a positive bus 19. The fact that the positive plate lugs are spaced or offset horizontally with respect to the negative plate lugs allows the lead wires to be burned thereto without danger of short circuits.

If the plate lug on one end of the double plate is longer than the lug on the other end, as is the case with the plate shown in the aforesaid United States patent, the plates are preferably so arranged that the long lug on the negative double plate assembly engages with the negative electrode or contact and the long lug on the positive double plate assembly projects upwardly.

According to the provisions of the present invention, plates of a lesser size width than those for which the tank A is designed and constructed are formed in the tank by casting dummy sections in or on the double grids of the plates to bring their overall size width up to that of the plates for which the tank is designed. After forming, etc., these dummy sections are removed, leaving finished plates of the desired size.

Figure 3:
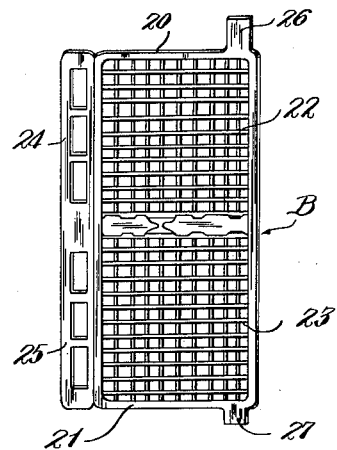
Fig. 3 is a perspective view of one of the double plates shown in Figs. 1 and 2.
Figure 2:
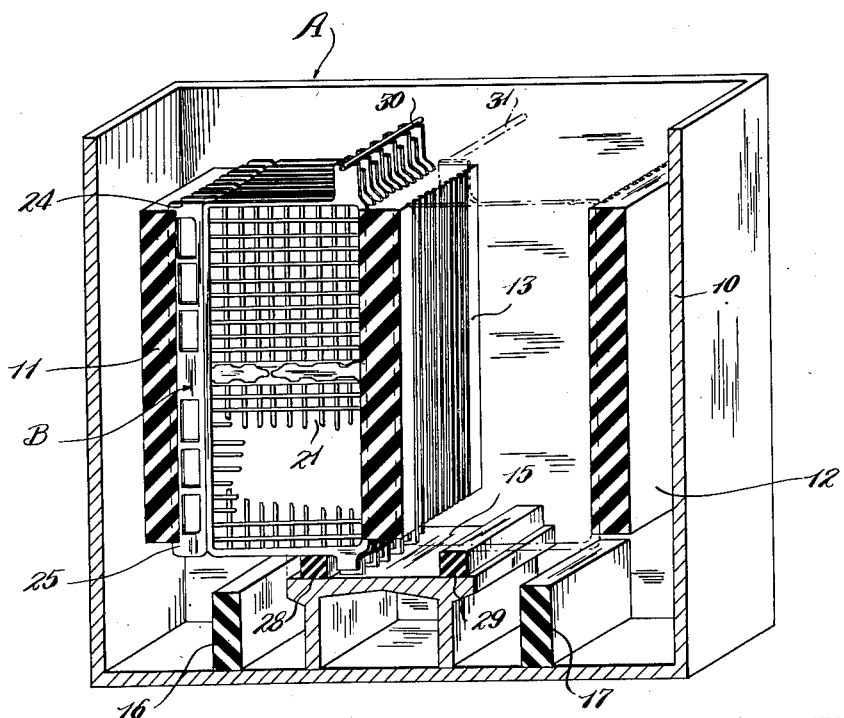
Fig. 2 is a sectional view on the line 2—2 of Fig. 1.

Referring particularly to Fig. 3, the double plate B shown therein comprises two plates 20, 21 consisting of pasted, oppositely facing grids 22, 23 cast as a unit and connected along their lower ends in such a manner that they can be broken apart to form two separate plates. Generally speaking, the grids may be similar to those disclosed in the aforesaid U. S. patent. It is to be understood, however, that the particular construction of the grids per se forms no part of the present invention except for the fact that one of the grid lugs at opposite ends of the double plate B is longer than the other.

In addition to being connected together in the manner referred to above, the grids have dummy sections 24, 25 cast integral therewith along one side, the particular form of which sections is of no importance other than that they should be of such a size as to bring the double grid up to the width size for which the machines or equipment upon which the grid is to be processed is designed. In the particular double plate shown, the plate lugs 26, 27 are adjacent to the side opposite the dummy sections, project from opposite ends, and the one lug, designated by the reference character 26, is longer than the other.

Double plates of the character referred to are formed in the forming tank A by alternately arranging positive and negative double plates B in side-by-side position in the racks within the tank 10 with the plate lugs adjacent to each other but with the long and short lugs of adjacent plates extending in opposite directions. When so arranged, the long lugs of the negative plates rest upon the negative contact or electrode 15 in the bottom of the tank while the downwardly extending, short lugs of the positive plates are held thereabove by engagement of the lower edges of the double plates B with temporary runners or rests 28, 29 formed of insulation positioned on the negative terminal 15, and the long lugs of the positive plates project above the short lugs of the negative plates, which facilitates the connection of lead wires 30, 31 thereto, which lead wires are, in turn, connected to the positive bus 18. The runners or rests 28, 29 extend for the length of the negative terminal and may consist of wood or rubber strip of suitable height. In the embodiment shown, the height of the rests 28, 29 is preferably approximately $\frac{1}{16}$ to $\frac{1}{8}$ of an inch less than the length of the long lugs 26 of the plates.

The old arrangement of having the plates arranged in a forming tank in such a manner that the plate lugs of the negative plates are along one side of the tank and those of the positive plate along the other side of the tank is not possible because, in this event, dummy sections would face plate sections containing active material which would produce unsatisfactory forming results.

From the foregoing disclosure, it will be apparent that the objects of the invention heretofore enumerated and others have been accomplished and that there has been provided a novel and improved, double grid and method of forming storage battery plates which enables equipment, such as a forming tank designed for one size of plate, to be used in forming plates of a different size. While the preferred embodiment of the invention has been described in considerable detail, the invention is not limited to the particular construction shown and it is my intention to cover hereby all adaptations thereof which come within the practice of those skilled in the art to which it relates and the scope of the appended claims.

Having thus described my invention, I claim:

1. A double battery plate grid blank having sections adapted to be pasted, two plate lugs integral with said plate grid and adjacent to one side of said plate grid, one of said lugs projecting from one end of said plate grid and the other lug projecting from the opposite end of said plate grid, one of said lugs being appreciably longer than the other, and a dummy section along one side of said plate grid, said dummy section adapted to be received in a plate rack of a forming tank whereby a plurality of plate grids can be vertically disposed side by side in the forming tank with alternate plate grids having the longer lugs thereof resting in line on an electrode in the forming tank and the other of the plate grids having the longer lugs thereof projecting upwardly and in line, and the dummy sections adjacent one another in the rack of the forming tank.

2. A double battery plate grid blank having sections adapted to be pasted, two plate lugs integral with said plate grid and adjacent to one side of said plate grid, one of said lugs projecting from one end of said plate grid and the other lug projecting from the opposite end of said plate grid, one of said lugs being appreciably longer than the other, and a dummy section along the side of the plate grid opposite said one side, said dummy section adapted to be received in a plate rack of a forming tank whereby a plurality of plate grids can be vertically disposed side by side in the forming tank with alternate plate grids having the longer lugs thereof resting in line on an electrode in the forming tank and the other of the plate grids having the longer lugs thereof projecting upwardly and in line and the dummy sections adjacent one another in the rack of the forming tank.

3. The method of forming lead-acid storage battery plates of the pasted grid type which comprises alternately arranging in vertical side-by-side position negative and positive double plates in a forming tank with one end of alternate plates engaging an electrode in the tank, said plates having a vertically extending dummy section along one side and arranged with the dummy sections adjacent to one another, said plates each having a pair of lugs of substantially different length adjacent to one side and one lug projecting from one end thereof and the other lug projecting from the opposite end thereof, said alternate plates having the longer of said lugs thereof at the bottom end and resting on the electrode and the plates adjacent said alternate plates having the shorter lugs at the bottom edge, supporting said plates vertically by maintaining said dummy sections upright, supporting the bottoms of said plates adjacent to said alternate plates so that the shorter lugs thereof are spaced from the electrode and the longer of the lugs thereof project upwardly beyond the shorter lugs of said alternate plates, connecting said upwardly projecting longer lugs with a second electrode, and impressing voltage between the lugs of the respective plates.

4. The method of forming lead-acid storage battery plates of the pasted grid type which comprises alternately arranging in vertical side-by-side position negative and positive double plates in a forming tank with one end of alternate plates engaging an electrode in the tank, said plates having a vertically extending dummy section along one side and arranged with the dummy sections adjacent to one another, said plates each having a pair of lugs of substantially different length adjacent to the side of the plates opposite the sides having said dummy sections and one lug projecting from one end thereof and the other lug projecting from the opposite end thereof, said alternate plates having the longer of said lugs thereof at the bottom end and resting on the electrode and the plates adjacent said alternate plates having the shorter lugs at the bottom edge, supporting said plates vertically by maintaining said dummy sections upright, supporting the bottoms of said plates adjacent to said alternate plates so that the shorter lugs thereof are spaced from the electrode, and the longer of the lugs thereof project upwardly beyond the shorter lugs of said alternate plates, connecting said upwardly projecting longer lugs with a second electrode, and impressing voltage between the lugs of the respective plates.

JOHN HOMAN.

REFERENCES CITED

The following references are of record in the file of this patent:

UNITED STATES PATENTS

| Number | Name | Date |
|---|---|---|
| 700,869 | Wilde | May 27, 1902 |
| 1,378,461 | Hubbell | May 17, 1921 |
| 1,381,387 | Wright | June 14, 1921 |
| 1,600,083 | Webster | Sept. 14, 1926 |
| 1,802,818 | Hutchinson | Apr. 28, 1931 |
| 2,156,379 | Donath | May 2, 1939 |
| 2,277,234 | Kerns | Mar. 24, 1942 |